United States Patent [19]

Hirahara et al.

[11] Patent Number: 5,775,448
[45] Date of Patent: Jul. 7, 1998

[54] CONTROL DEVICE OF A START-ASSIST SYSTEM

[75] Inventors: Hideto Hirahara; Masaaki Kano; Minori Higuchi; Haruyuki Hosoya, all of Kawasaki, Japan

[73] Assignee: Isuzu Motors Limited, Tokyo, Japan

[21] Appl. No.: 679,230

[22] Filed: Jul. 12, 1996

[51] Int. Cl.$^6$ .................................................. B62D 61/12
[52] U.S. Cl. ............................................. 180/24.02; 280/840
[58] Field of Search ................................. 180/24.02, 209;
280/6.11, 6.12, 840, 676, 704

[56] References Cited

U.S. PATENT DOCUMENTS

| | | | |
|---|---|---|---|
| 4,141,430 | 2/1979 | Eddy | 180/24.02 |
| 4,993,729 | 2/1991 | Payne | 180/24.02 |
| 5,228,704 | 7/1993 | Tabe | 280/6.11 |
| 5,286,059 | 2/1994 | Tabe | 280/840 |
| 5,522,469 | 6/1996 | Hosoya et al. | 180/24.02 |

*Primary Examiner*—Paul N. Dickson
*Attorney, Agent, or Firm*—Antonelli, Terry, Stout, & Kraus, LLP

[57] ABSTRACT

A start-assist system provided in a vehicle having two rear shafts, one of which is a drive axle, includes a control device having an air actuator attached to the drive axle; a level sensor for detecting loads applied to the shaft axles; an air supply source for supplying compressed air to the air actuator; a first valve disposed in an air conduit for supplying air to the air actuator; a second valve for releasing air from the air actuator; and a controller for controlling the first valve and the second valve. The a controller opens the first valve to introduce air to the air actuator when a signal from the level sensor indicates that the vehicle is stopped and is unladen, and opens the second valve to release air from the air actuator when the signal from the level sensor indicates that the vehicle is stopped and parking brake is activated.

7 Claims, 15 Drawing Sheets

FIG. 14
Output modes from CPU

| output modes | Supply valve A(820) | Release valves | |
|---|---|---|---|
| | | B1(830) | B2(832) |
| A | Open | Close | Close |
| B | Close | Open | Close |
| C | Close | Open | Open |
| Stop | Close | Close | Close |

FIG. 15

| | Conditions for releasing air | Release valve(s) used | |
|---|---|---|---|
| | | B1(830) | B2(832) |
| Slow release | Speed > 20km/h | ○ | × |
| | Load (laden) | ○ | × |
| | Actuator switch OFF | ○ | × |
| Quick release | Parking brake ON | ○ | ○ |
| | Key switch OFF | ○ | ○ |

CONTROL DEVICE OF A START-ASSIST SYSTEM

BACKGROUND OF THE INVENTION

1. Field of the Invention

This invention relates to a control device of a start-assist system installed in a vehicle of a type having two rear axles.

2. Description of the Prior Art

FIG. 9 is a schematic explanatory view of a vehicle having two rear axles. A large vehicle, labelled 1, has a front axle 21 mounted in a front location of a frame 10 to support front wheels 21a. The vehicle 1 has two rear axles 31 and 32 which support wheels 31a and wheels 32a, respectively.

These two rear axles 31, 32 are supported by the frame 10 via a suspension 40, and the frame 10 supports cargo 50 thereon.

The whole weight WG of the vehicle 1 including the cargo 50 is divided into a load WF applied to the front wheels 21a and a load WR applied to the rear wheels 31a and 32a, and the ground G bears both these loads WF and WR.

Since the vehicle 1 has two axles 31 and 32 in the rear, the load WR applied to the rear half of the vehicle 1 is divided to a load WRF supported by the rear front axle 31 and a load WRR supported by the rear-rear axle 32. By limiting the maximum possible load applied to a single axle in this manner, vehicles for larger loads can be constructed.

Among various vehicles having two rear axles, so-called 6'2 vehicles have been developed, in which the power transmission system is simplified by using the rear-front axle 31 as a drive axle for receiving the drive force from the engine and using rear-rear axle 32 as an idler axle which does not receive the drive force.

In these 6×2 vehicles, the drive wheels 31a must generate a sufficient propulsive force. In this connection, the load WRF applied to the wheels 31a must be large enough to generate a sufficient propulsive force between the wheel 31a and the ground G.

When the vehicle is laden, the load WRF applied to the drive axle 31 is large enough to generate a sufficient propulsive force at the wheels 31a.

However, when the vehicle 1 is unladen, the load WRF to the drive axle 31 may be too small, and the wheels 31a may fail to produce a sufficient propulsive force against the ground G. In particular, when the vehicle is going to start moving on ground having a small friction coefficient, it often fails to start successfully due to slippage of the wheels 31a.

The present Applicant previously proposed a start-assist system for use in a vehicle configured to drive one of two rear axles, as described in Japanese Patent Application No. 6-30087.

The invention of the above application uses an air actuator for adjusting the load to the drive axle and a level sensor for detecting a change in load to the axles and for controlling behavior of the air actuator, in order to increase the driving force exerted when the vehicle starts to move.

The above start-assist system improves the driveability of a vehicle on ascending slopes and the braking reliability on slopes.

That is, as shown in FIG. 10, a parking brake 65 of a vehicle of this type is configured to mechanically lock a drive shaft 60 for transmitting a driving force to the drive axle 31 equipped with the start-assist system. Thus, the performance of the parking brake 65 can be improved by increasing the load to the locked drive axle by activating the start-assist system.

When the vehicle stops, the start-assist system is activated and prepared for the next start. As mentioned above, since the load to the drive wheels 31a is increased, the vehicle can probably be parked even on the slope SL where a vehicle without the start-assist system cannot be parked.

When the driver intends to park the vehicle and activate the parking brake, subsequently, he probably turns the engine key OFF to stop the engine, and the air compressor also stops.

At this time, if the air actuator of the start-assist system normally operates with a sufficient amount of air contained in the air tank, no problem occurs. However, if the air pressure in the air actuator decreases for a certain reason after the driver leaves the vehicle, then the load to the wheel axle decreases, and the vehicle may slip down the slope because a sufficient frictional force for the parking brake is no longer present.

It is therefore desirable that when the parking brake is activated or the engine key is turned off, air is released from the air actuator to equalize the load to the drive wheels to that of a normal vehicle, so as to prohibit parking of the vehicle under the aid of the start-assist system on slopes where ordinary vehicles cannot park.

Consequently, if air is released from the air actuator after the driver leaves the vehicle, it may cause the problem that the unmanned vehicle may slip down the slope. Therefore, release of air from the air actuator must be completed quickly before the driver leaves his seat.

In contrast, release of air from the air actuator in ordinary running motions of the vehicle is desired to be slow and moderate to prevent sudden changes in posture of the vehicle.

OBJECTS AND SUMMARY OF THE INVENTION

It is therefore an object of the invention to provide a control device for a start-assist system overcoming the above-indicated disadvantages.

According to a first aspect of the invention, there is provided a control device in a start-assist system equipped in a vehicle having two rear axles one of which is a drive axle including an air actuator attached to the drive axle, in which the control device comprises a parking brake switch; a speed sensor for detecting the speed of the vehicle; a level sensor for detecting loads applied to the axles; an air supply source for supplying compressed air to the air actuator; a first valve disposed in an air conduit for supplying air to the air actuator; a second valve for releasing air from the air actuator; and control means for controlling the first valve and the second valve.

The control means opens the second valve to release air from the air actuator upon detecting that the parking brake is activated.

According to a second aspect of the invention, there is provided a control device in a start-assist system equipped in a vehicle having two rear axles, one of which is a drive axle, and including an air actuator attached to the drive axle, in which the control device comprises an engine key switch; a speed sensor for detecting the speed of the vehicle; a level sensor for detecting loads applied to the axles; an air supply source for supplying compressed air to the air actuator; a first valve disposed in an air conduit for supplying air to the air actuator; a second valve for releasing air from the air actuator; and control means for controlling the first valve and the second valve.

The control means opens the second valve to release air from the air actuator upon detecting that the engine key switch is turned off.

According to a third aspect of the invention, there is provided a control device in a start-assist system equipped in a vehicle having two rear axles one of which is a drive axle. and including an air actuator attached to the drive axle, in which the control device comprises an engine key switch; a speed sensor for detecting the speed of the vehicle; a parking brake for braking a power transmission mechanism to the drive axle; a parking brake switch for detecting activation of the parking brake; a level sensor for detecting loads applied to the axles; an actuator switch of the start-assist system; an air supply source for supplying compressed air to the air actuator; a supply valve disposed in an air conduit for supplying air to the air actuator; two release valves for releasing air from the air actuator; and control means for controlling the first valve and the second valve.

The control means outputs, depending on conditions of the vehicle, a first mode signal for opening the supply valve and closing both release valves, a second mode signal for closing the supply valve and opening one of the release valves, and a third mode signal for closing the supply valve and opening both release valves.

BRIEF DESCRIPTION OF THE DRAWINGS

FIG. 14 is a table showing output modes of a control unit;

FIG. 15 is a table showing relations between valves and conditions for releasing air;

DETAILED DESCRIPTION OF THE PREFERRED EMBODIMENTS

Figure 4:
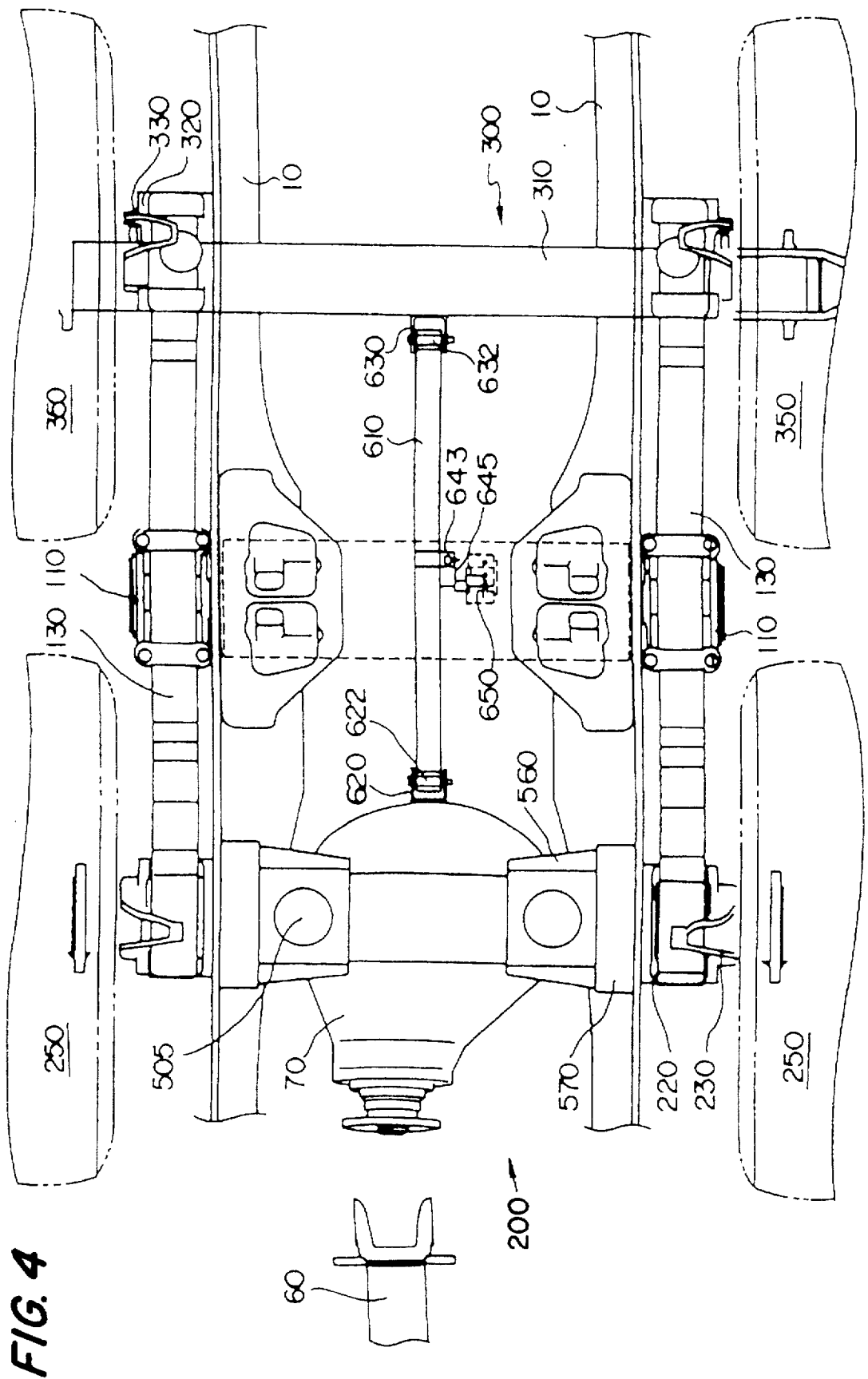
FIG. 4 is a plan view of a vehicle equipped with a start-assist system.
Figure 5:
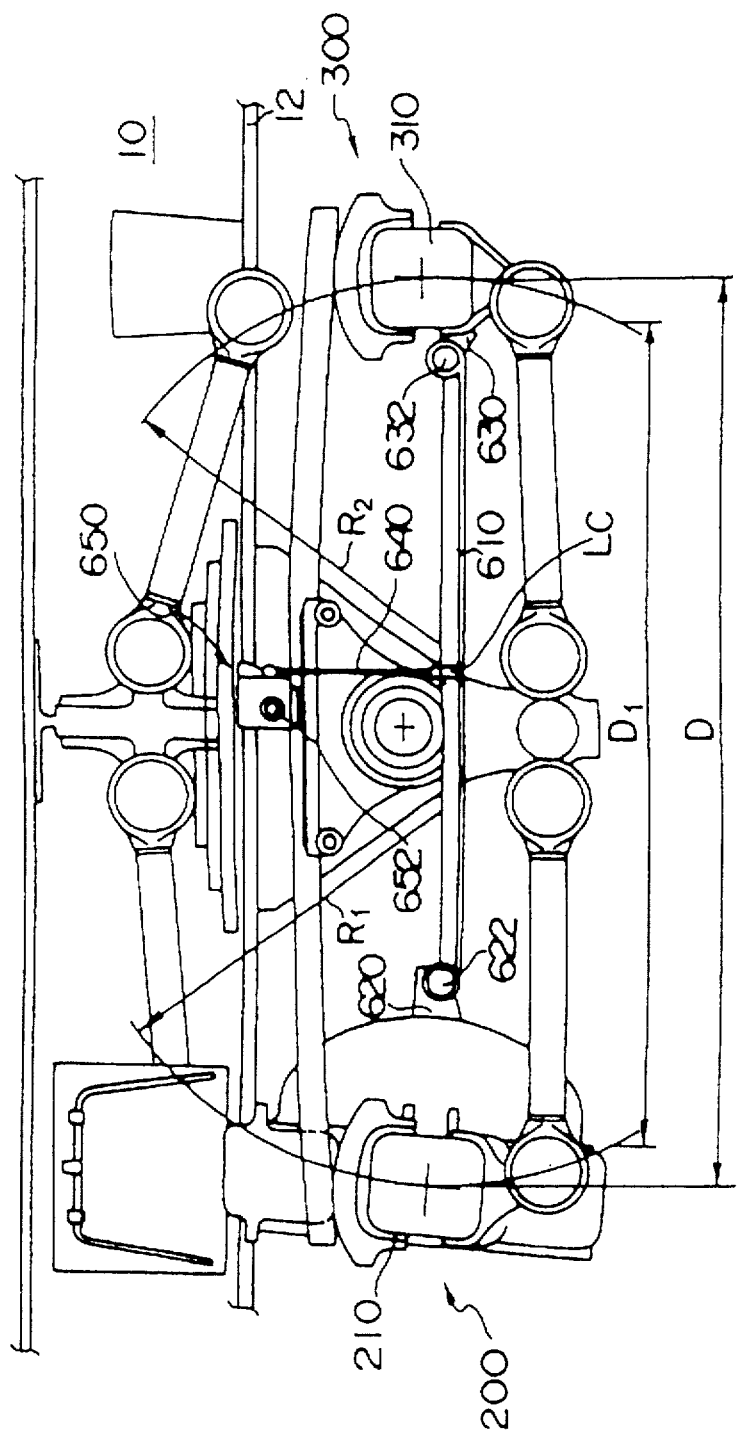
FIG. 5 is a side elevation of the vehicle of FIG. 3.
Figure 6:
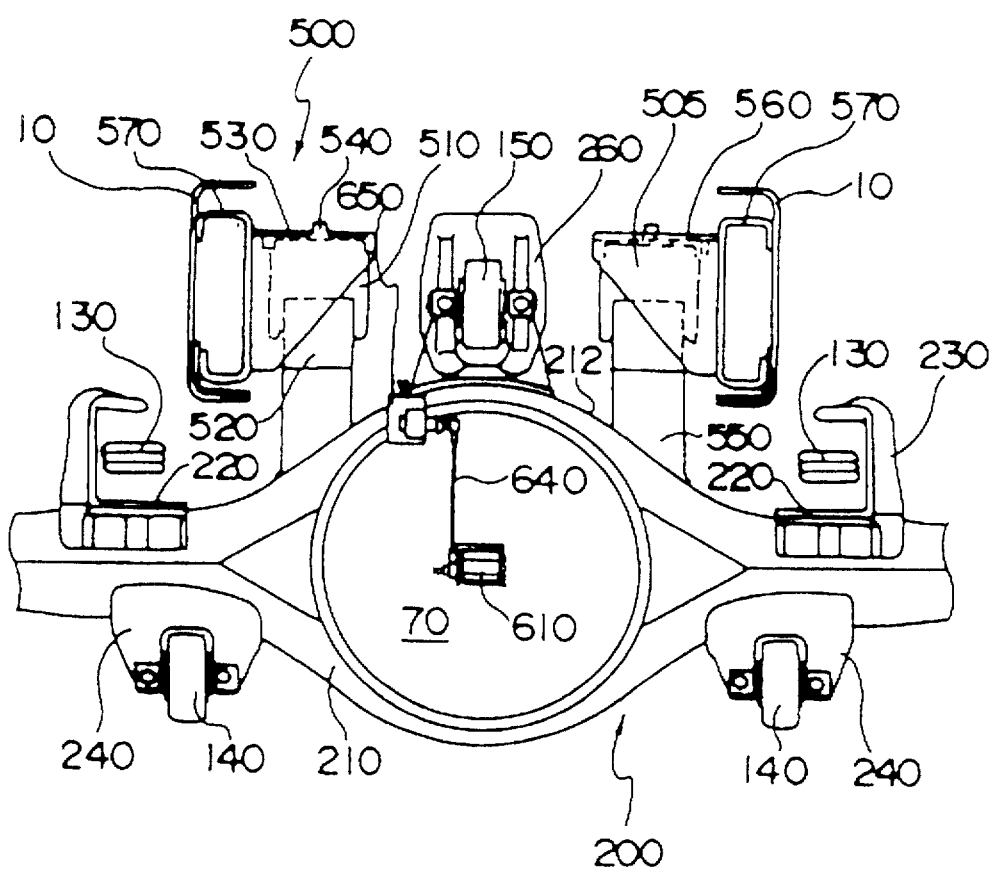
FIG. 6 is a front elevation of a drive axle.

FIGS. 4 to 6 schematically show a start-assist system equipped in a vehicle having a trunnion suspension to increase the drive force required when the vehicle starts to run.

The vehicle has a frame 10 disposed at right and left sides of the vehicle body to support a drive axle 200 and an idler axle 300.

An engine disposed at a front portion of the vehicle and a drive shaft 60 coupled to a gear box transmit power to a differential gear mechanism contained in a differential gear case 70 which is integral with the drive axle 200. The trunnion suspension has trunnion brackets 110 fixed on the lower surface of the frame 10. The trunnion bracket 110 rotatably supports a trunnion shaft which in turn supports a central portion of a leaf spring 130.

The leaf spring 130 is a laminated plate member made by stacking several to ten leaf springs.

The drive axle 200 is a unit including a drive axle rotatably contained in a cylindrical housing 210 and supporting drive wheels 250 at opposite ends. In general, the drive wheels 250 are two at each end of the drive axle and so four in total.

Provided on the housing 210 of the drive axle 200 is a sliding sheet 220 which receives one end of the leaf spring 130. The leaf spring exerts a resilient force urging the drive axle 200 to the ground. Spring pressers 230 are provided at opposite ends of the sliding sheet 220.

A first torque rod is attached to the lower surface of the drive shaft housing 210 via a bracket. The first torque rod is coupled to a second torque rod through a coupling member extending through the trunnion bracket 110.

The idler axle 300 does not directly receive the driving force from the engine, but rotatably supports idler wheels 350. In general, the idler wheels 350 are two at each end of idler shaft 300, and so four in total; however, they may be only one at each end.

A central portion of the drive axle housing 210 projects upward and downward for containing the differential gear case 70. A bracket 260 is mounted on the top of the upper projecting portion, and a third torque rod 150 is coupled to the bracket.

With the above-explained construction of the trunnion suspension, any appropriate ratio of loads distributed to both axles can be selected by appropriately determining the distance between the center of the trunnion shaft and the center of the drive axle 200, and the distance between the center of the trunnion shaft and the center of the idler axle 300. The drive shaft 200 and the idler axle 300 can move along circular orbits of radii R1 and R2, and the distance between the two axles varies between D and D1.

A start-assist system to which the invention is applied is mounted on the drive axle 200.

A start-assist system, labelled 500, includes an air actuator 505 and its mounting structure. The air actuator 505 comprises a diaphragm 510, a piston member 520 disposed under the diaphragm 510, and an upper plate 530 disposed on the diaphragm 510. A lower portion of the diaphragm 510 is attached to a bracket on the drive shaft. An upper portion of the diaphragm 510 is attached to a bracket on the part of the frame.

Used as the vehicle frame 10 is a channel material having a channel-shaped cross section for example. An attachment member 570 of the frame-side bracket is fixed to the inner side of the frame 10. A bracket 560 opening downward is integrally mounted to the attachment member 570 and securely contains an upper plate 530 of the air actuator 505 inside. An air inlet 540 of the air actuator 505 projects upward, passing through the bracket 560.

The air inlet 540 is connected to a compressed air source through an air supply pipe which will be explained later.

Since large vehicles, in general, are equipped with an air compressor and a high-pressure tank for assisting clutching and braking actions, the same source of the compressed air can be utilized for this purpose.

Under the condition with no compressed air introduced to the air actuator 505, the drive axle 200 and the idler axle 300 receive loads of a ratio equal to that in an ordinary trunnion suspension.

When compressed air is introduced into the air actuator 505, the diaphragm 510 expands and biases the drive axle 200 toward the ground. This biasing force increases the load applied to the drive wheels 250 and hence increases the propulsive force produced between the drive wheels 250 and the ground.

Therefore, if the start-assist system is activated when the vehicle starts to run where a large propulsive force is required, the vehicle can start smoothly and reliably.

The air actuator used as an element of the start-assist system is liable to break down because the diaphragm, in particular, is made of a flexible material. The air actuator is therefore protected by locating it at the inner side of the vehicle frame and by covering it with a bracket.

The trunnion suspension permits the housing to rotate about the center line of the axle when the vehicle axle moves vertically. This rotation causes deviations at the upper support portion and other support portions of the air actuator; however, adverse effects of these deviations can be minimized by locating the air actuator on the drive axle housing 210.

Figure 7:
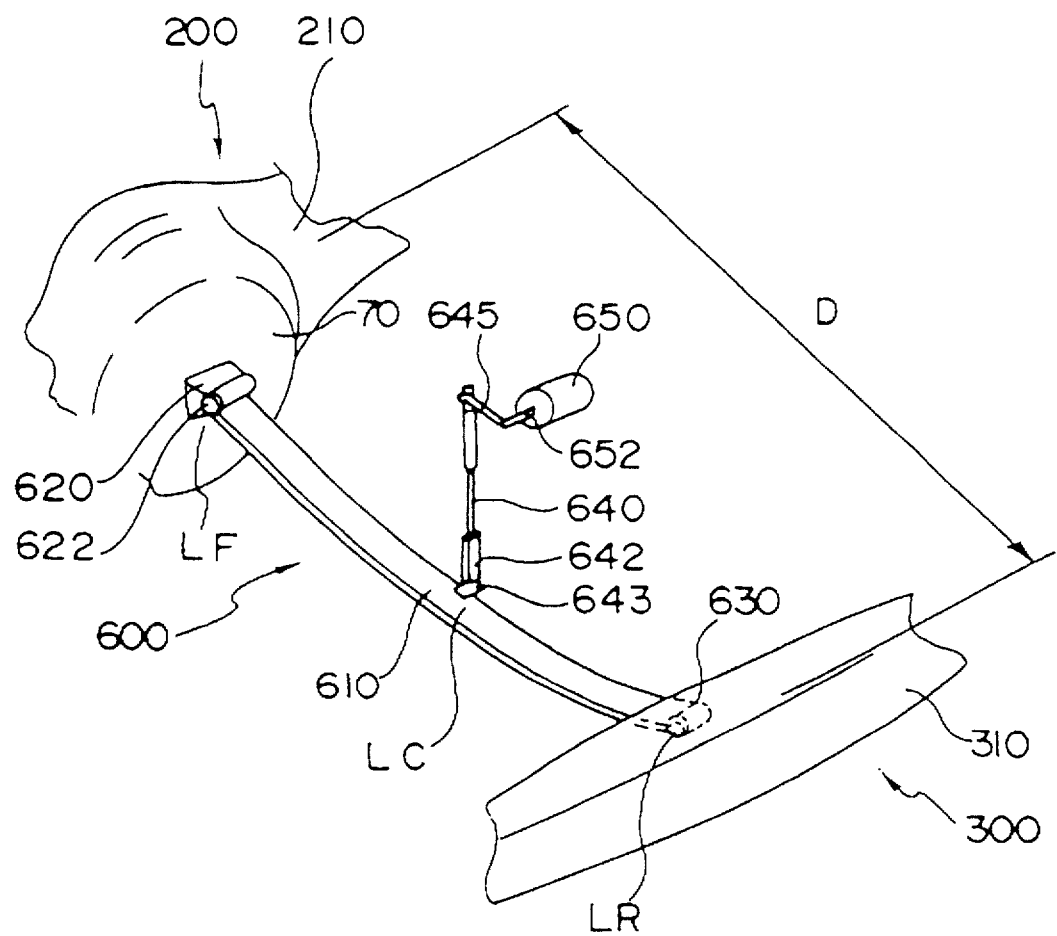
FIG. 7 is an explanatory view of a load detector.

In FIG. 7, an axle-load detector, labelled 600, comprises a leaf spring 610 and a level sensor 650 for detecting a change in position of the center of the leaf spring 610.

The two-rear-axle vehicle has a first rear axle 200 and a second rear axle 300. The first rear axle nearer to the front axle comprises the housing 210 including an axle, and a differential gear case 70, and behaves as a drive axle. The second rear axle 300 has a housing 310 and behaves as an idler axle which does not receive the driving force. It is of course possible to configure the second rear axle 300 to behave as a drive axle.

A front end portion of the leaf spring 610 is supported on a rear portion of the differential gear case 70 within drive axle housing 210 of the drive axle 200 via a bracket 620. A rear end portion of the leaf spring 610 is supported on a front portion of the idler shaft housing 310 via a bracket 630. A bush 622 is provided between the bracket 620 and the leaf spring 610 to absorb relative twist or other stress between the bracket and the leaf spring. Also the idler axle bracket 630 similarly supports a leaf spring via a bush.

The leaf spring 610 supports the lower end of a vertically extending rod 640 at its central portion of the leaf spring via mount members 642, 643. The upper end of the rod 640 is coupled to a horizontally extending arm 645 which rotates a shaft 652 of the level sensor 650.

The level sensor 650 is fixed to the chassis of the vehicle to electrically detect the amount of rotation of the shaft 652.

When any change occurs in loads applied to the drive axle 200 and the idler axle 300, the suspension deforms by changing the vertical distance between the position of the rod support portion LC of the leaf spring and the position of the level sensor 650. Therefore, by electrically detecting a change in this distance, loads applied to the drive axle 200 and the idler axle 300 can be detected.

Among various types of suspension for two-rear-axle vehicles, there is one in which inter-axle distance D varies with changes in heights of the axles 200 and 300 from the ground.

If the axle-load detector mentioned above is used in a vehicle having a suspension of this type, the sensitivity of detecting loads to axles can be improved.

That is, as the inter-axle distance D is increased by the load with respect to distance under the unladen status, the distance between the front-end attachment LF and the rear-end attachment LR of the leaf spring 610 is increased, and the rod support portion LC rises bringing the rod 640 upward.

Since the rod 640 rotates the shaft 652 of the sensor 650 by the amount of the displacement of the leaf spring 610 plus the vertical displacements of the shafts 200 and 300 from the ground, the angle of rotation of the shaft 652 becomes large, and the sensitivity is improved.

Figure 8B:
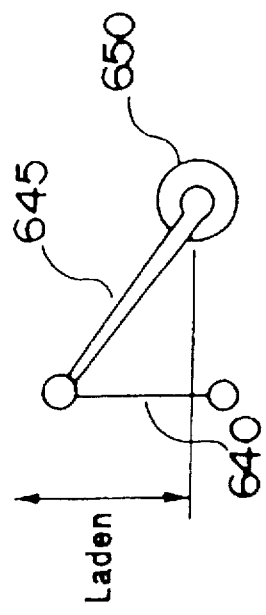
FIG. 8A and FIG. 8B are an explanatory views of a level sensor.
Figure 8A:
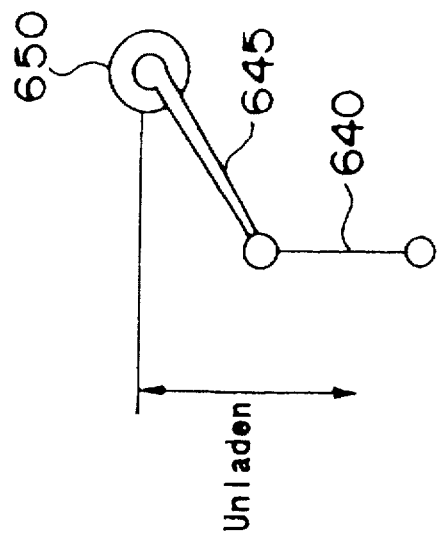
Figure 9:
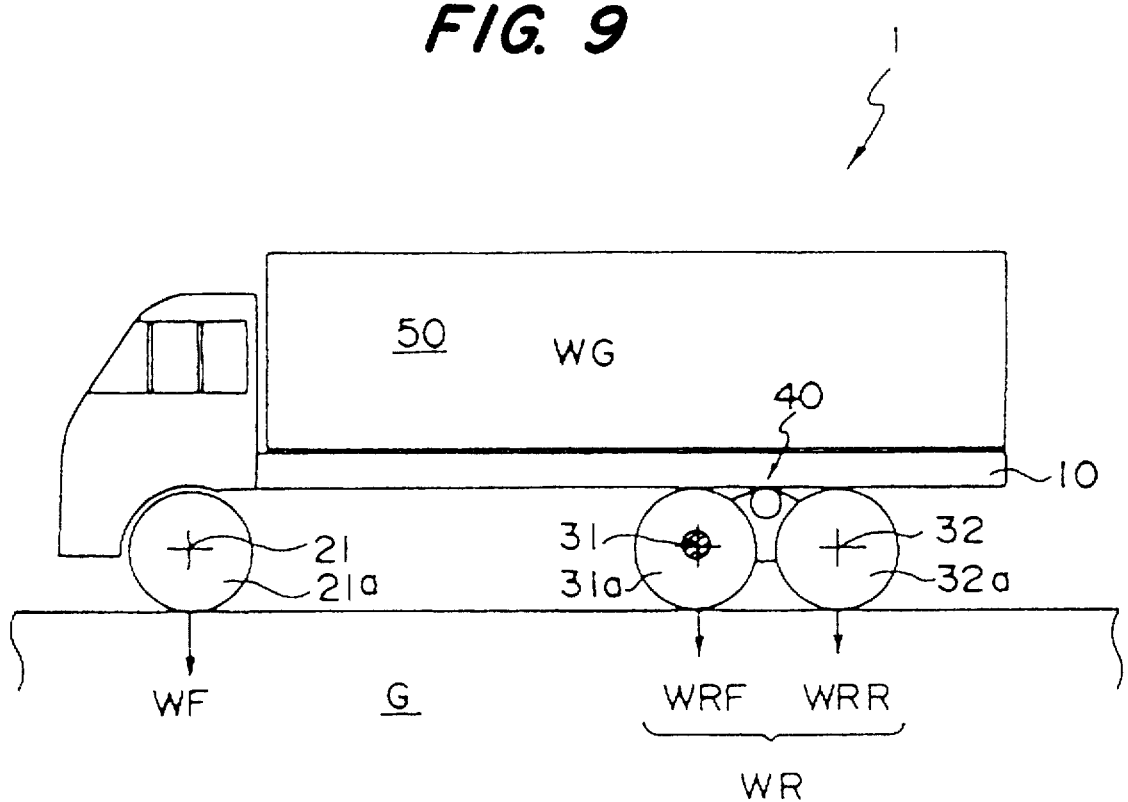
FIG. 9 is an explanatory view showing a general aspect of a vehicle having two rear axles.
Figure 10:
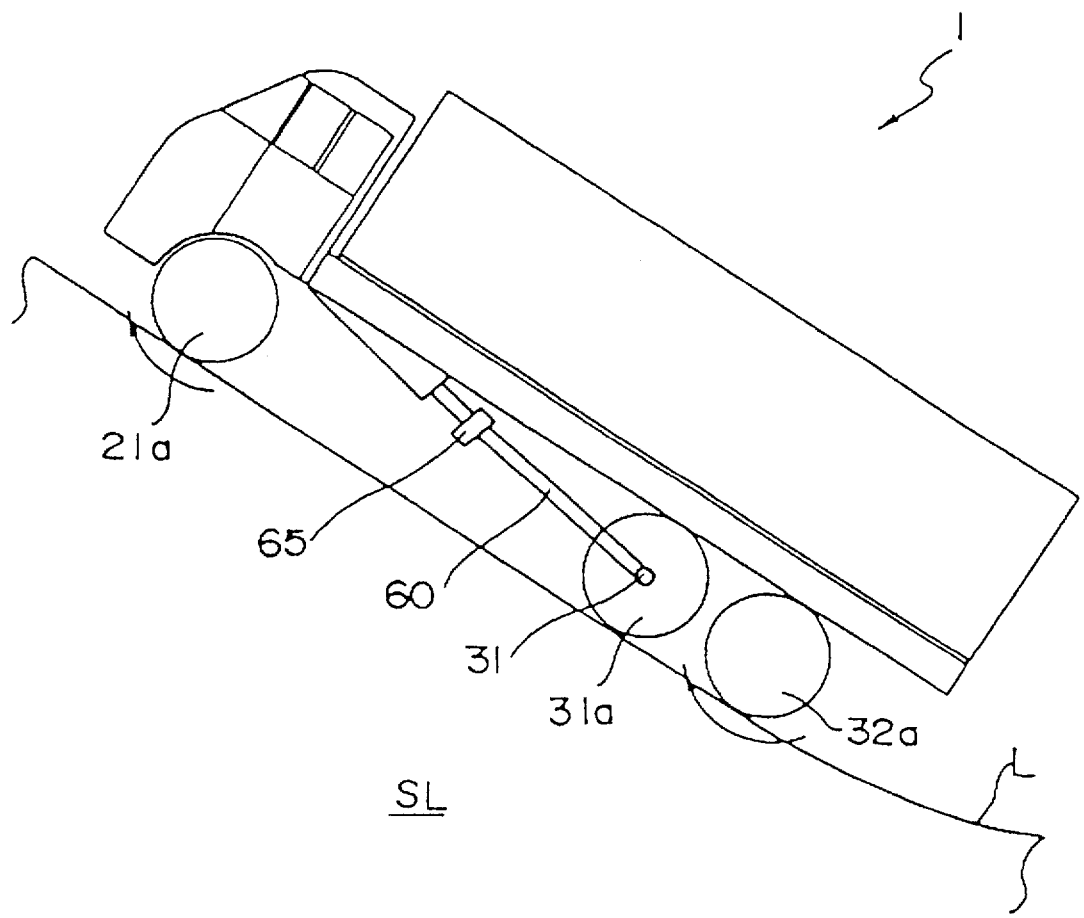
FIG. 10 is an explanatory view showing a general aspect of a vehicle which is parking on a slope.

The sensor 650 varies in its output voltage depending on the position of the arm 645. Thus, as shown in FIG. 1, together with FIGS. 8A and 8B, CPU 860 determines that the vehicle is laden when the arm 645 is elevated by the rod 640 beyond a given position, and determines that the vehicle is unladen when the rod 640 remains below the given position.

Figure 1:
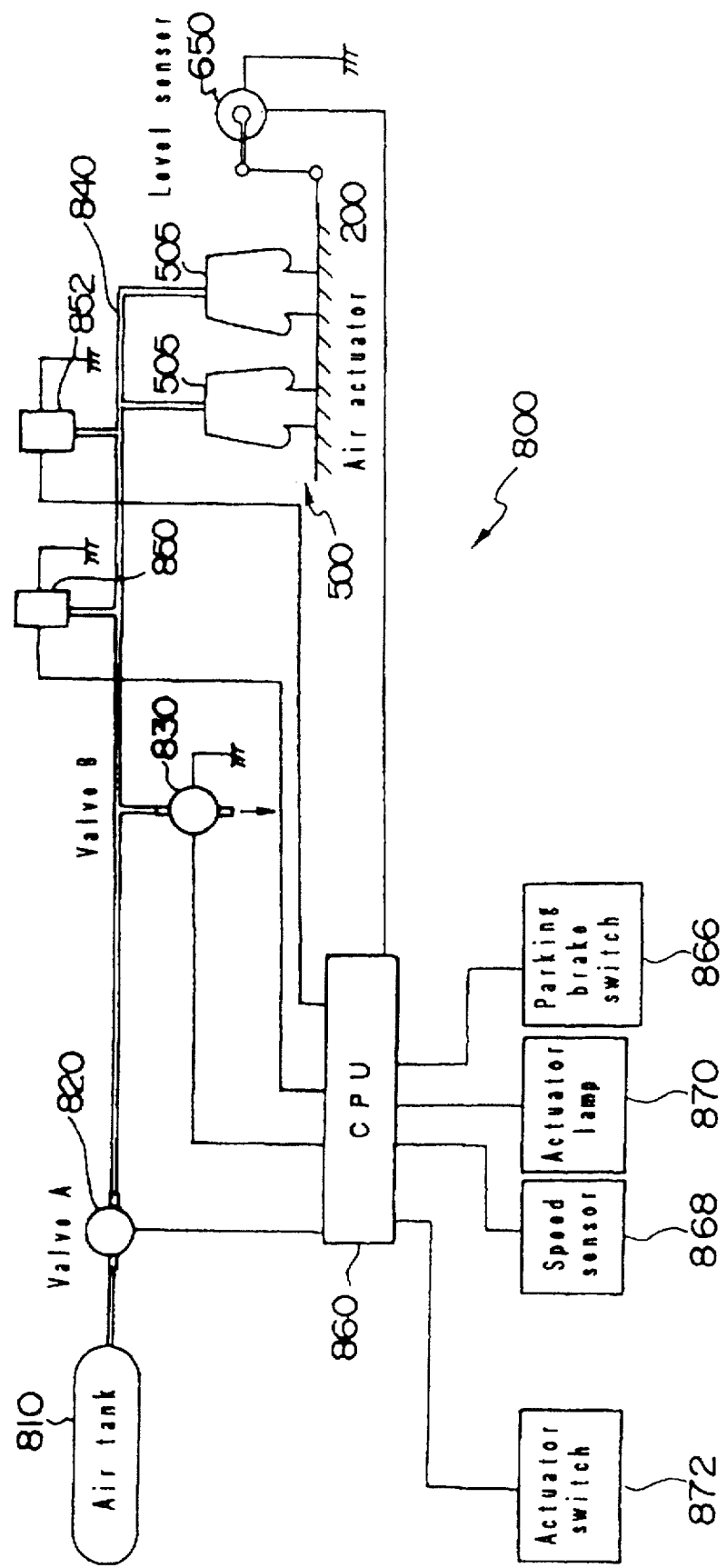
FIG. 1 is an explanatory block diagram of a control device according to a first embodiment e invention.

FIG. 1 is an explanatory block diagram showing a general aspect of a control device according to a first embodiment of the invention.

The control device 800 of a start-assist system comprises an air tank 810 containing air which is supplied to the air actuator 505 of the start-assist system 500 through a first magnetic valve 820 (valve A), second magnetic valve 830 (valve B), conduit 840, first pressure switch 850 for detecting a low pressure, and second pressure switch 852 for detecting a high pressure, and increases the load to the drive shaft 200.

CPU 860, used as a control unit, is coupled to a parking brake switch 866, an actuator switch 872, an actuator lamp 870, a speed sensor 868, a level sensor 650 for detecting the load to the shaft, first pressure switch 850 and second pressure switch 852 to control first magnetic valve 820 and the second magnetic valve 830.

The first magnetic valve 820 is opened to supply air from the air tank 810 to the conduit 840, and the second magnetic valve 830 is opened to release air from the conduit 840.

Figure 2:
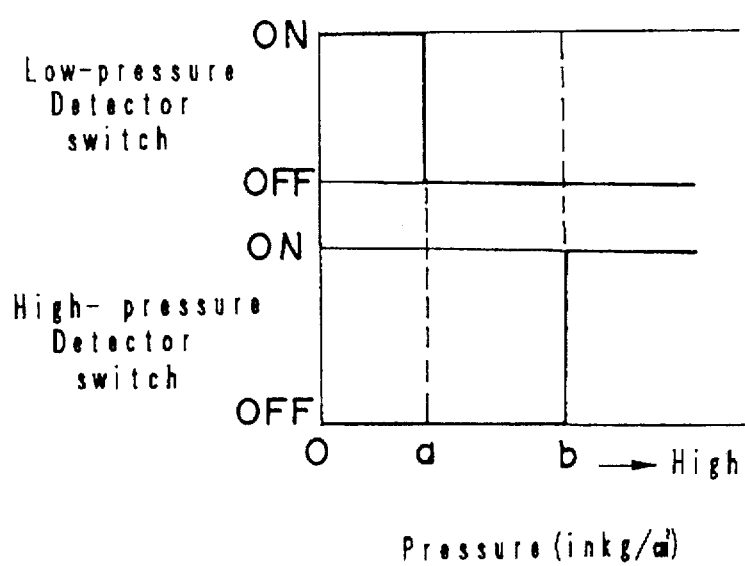
FIG. 2 is an explanatory diagram showing operations of a pressure detecting switch.

FIG. 2 shows an aspect of operation of the pressure detecting switches.

The low-pressure detecting switch detects whether air is sufficiently released from the air actuator when the air is released, and turns on when the pressure is the predetermined value of "a" kg/cm$^2$ or lower as illustrated.

The high-pressure detecting switch detects that sufficient air is introduced into the air actuator when the air is supplied, and turns on when the pressure is the predetermined value of "b" kg/cm$^2$ or higher.

The load to the drive wheels is equal to that of a vehicle without a start-assist system when the pressure is equal to or below the predetermined value "a".

When the pressure is equal to or above the predetermined value "b", the load to the drive wheels increases, and the propulsive force also increases.

Operation of the Start-Assist System of the first embodiment

Figure 3:
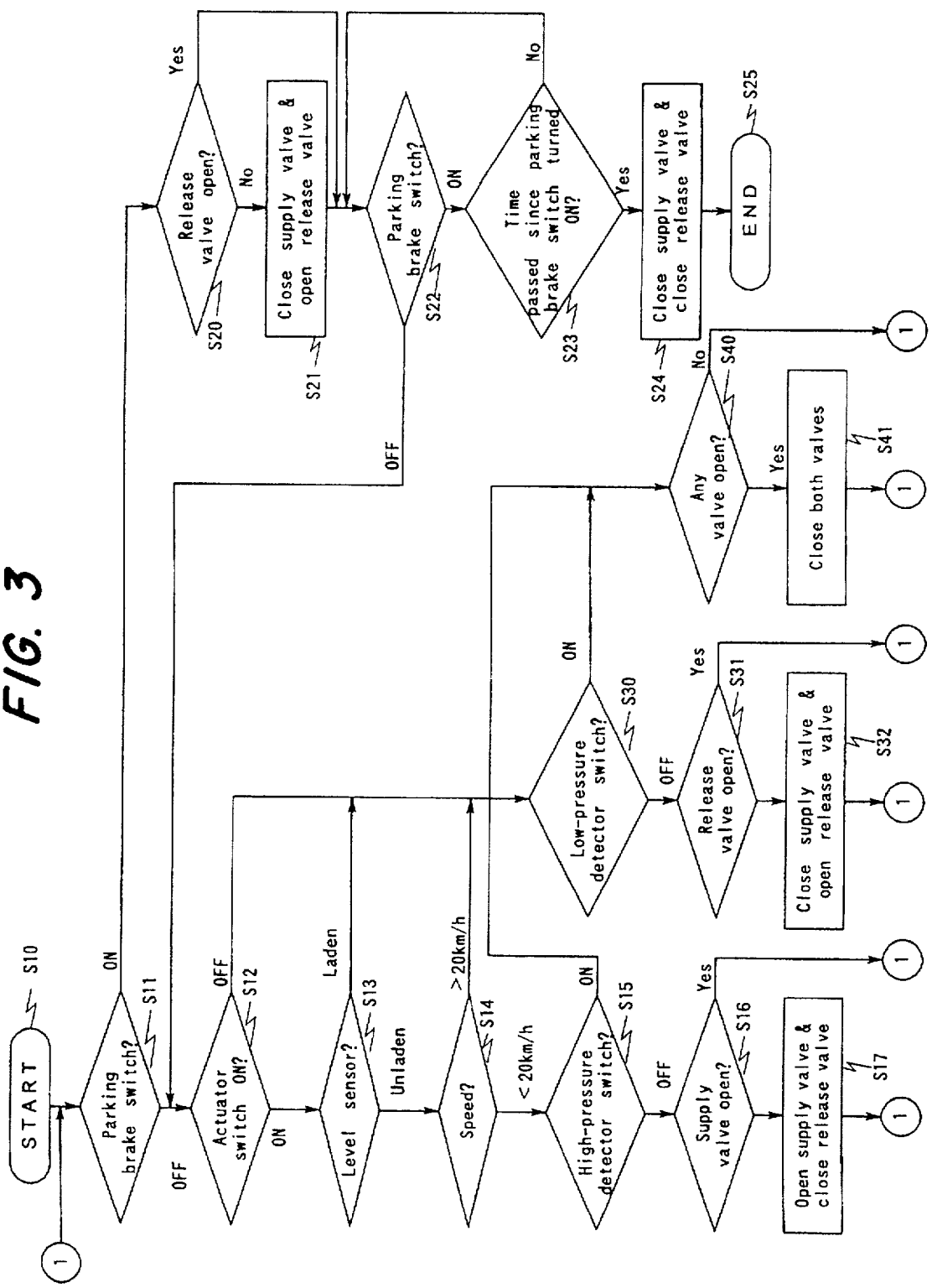
FIG. 3 is a flow chart of the process of control by the control device according to first embodiment.

FIG. 3 is a flow chart showing the process of control by the control device 800 according to the first embodiment. The process starts with step S11 and proceeds to step S14 following the flow chart. In step S14, if the speed of the vehicle is less than 20 km/h, the process goes to step S15 to activate the start-assist system. In step 15, the pressure of the air actuator is checked.

When the high-pressure detecting switch is OFF in step S15, which means that sufficient air is not supplied, the flow goes to step S16 to confirm whether the supply valve is open. If not, the process goes to step S17, opens the supply valve to start the supply of air to the air actuator, and returns to step S11. If the supply valve is already open in step S16, the process returns directly to step S11.

Even after returning to step S11, the control repeats the same flow to continue the supply of air in step S15 until the high-pressure detecting switch turns on.

When sufficient air is introduced to the air actuator and the high-pressure detecting switch turns on in step S15, the flow proceeds to step S40 and step S41 to close the valve, and the flow of the process ends.

Release of air under no need for the aid of the start-assist system of the first embodiment When the parking brake is not operated and the parking brake switch is off in step S11, the flow goes to step S12. If the actuator switch is OFF in step S12, the flow goes to step S30. If the actuator switch is ON in step S12, the flow goes to step S13. If the load sensor detects the laden condition in step S13, the flow goes to step S14. If the speed of the vehicle is more than 20 km/h, it goes to step S30 to release air.

If the low-pressure detecting switch is OFF in step S30, which means that the air actuator contains sufficient air, the process goes to step S31. If the release valve is not open, the flow proceeds to step S32 where the release valve is opened to permit air to start releasing from the air actuator, and then the flow returns to step S11.

If the release valve is already open in step S31, the process returns directly to step S11.

After returning to step S11, the same flow is repeated to continue the release of air in step S30 until the low-pressure detecting switch turns on.

When a sufficient amount of air is released from the air actuator and the low-pressure detecting switch turns on in step S30, the flow proceeds to step S40 and step S41 to close the valve. In this sequence, air is released when the start-assist system need not operate.

Release of air of the first embodiment when the parking switch is on

If the parking brake works and the parking brake switch is ON in step S11, the control goes to step S20. If the release valve is not open, it is opened in step S21 to start releasing air from the air actuator. Then the process goes to step S22. If the release valve is already open in step S20, the flow goes directly to step S22.

In step S22, the status of the parking brake switch is checked again in order to confirm whether the parking brake has been released or not while air is removed. If it is confirmed that the parking brake is held in operation in step S22, the flow goes to step S23. When a predetermined length of time has passed after the parking brake is operated and the parking brake switch turns on, the control opens the valve in step S24, and finishes the process.

The predetermined time, referred to above, is the time required for completely releasing air from the air actuator, and it is pre-stored in CPU 860.

Thus, parking of the vehicle under the aid of the start-assist system is prohibited by releasing air in this sequence when the parking brake is operated.

According to the first embodiment described above, in a vehicle having two rear axles one of which behaves as a drive axle, and equipped with the start-assist system which includes the air actuator attached to the drive axle and activated upon starting the vehicle to increase the load, the start-assist system includes the control device for releasing air from the air actuator when detecting a signal indicating that a driver has stopped the vehicle and has set the parking brake operative. By inactivating the start-assist system when the parking brake is operated, the parking-braking force shared by the drive wheels is made equivalent to that of a vehicle without the start-assist system, thereby to reliably prevent slippage or other like troubles of the vehicle.

Figure 11:
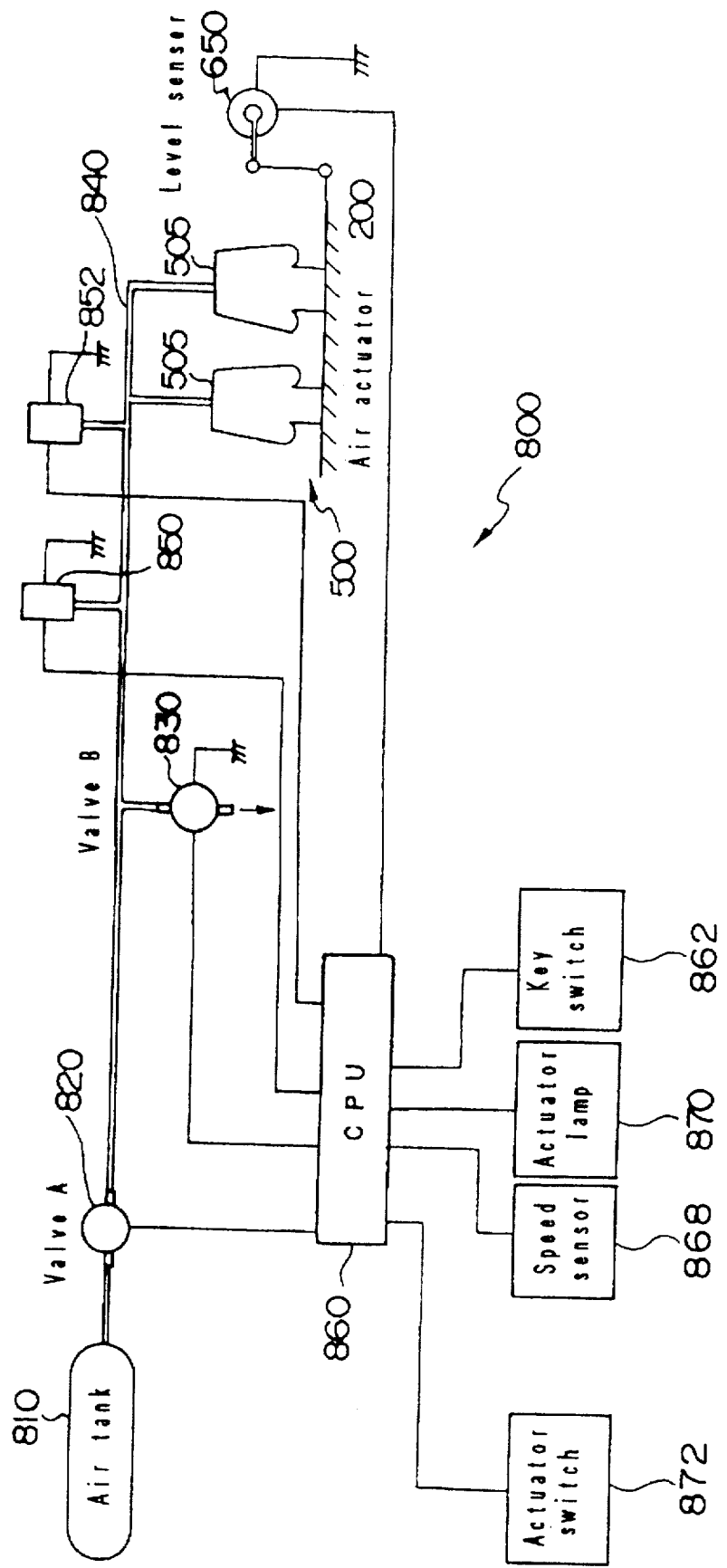
FIG. 11 is an explanatory block diagram of a control device according to a second embodiment of the invention.

FIG. 11 is an explanatory block diagram showing a general aspect of a control device according to a second embodiment of the invention.

The second embodiment is substantially the same as the first embodiment except that a key switch 862 in lieu of the parking brake switch 866 is connected to CPU 860.

Operation of the Start-Assist System of the second embodiment

Figure 12:
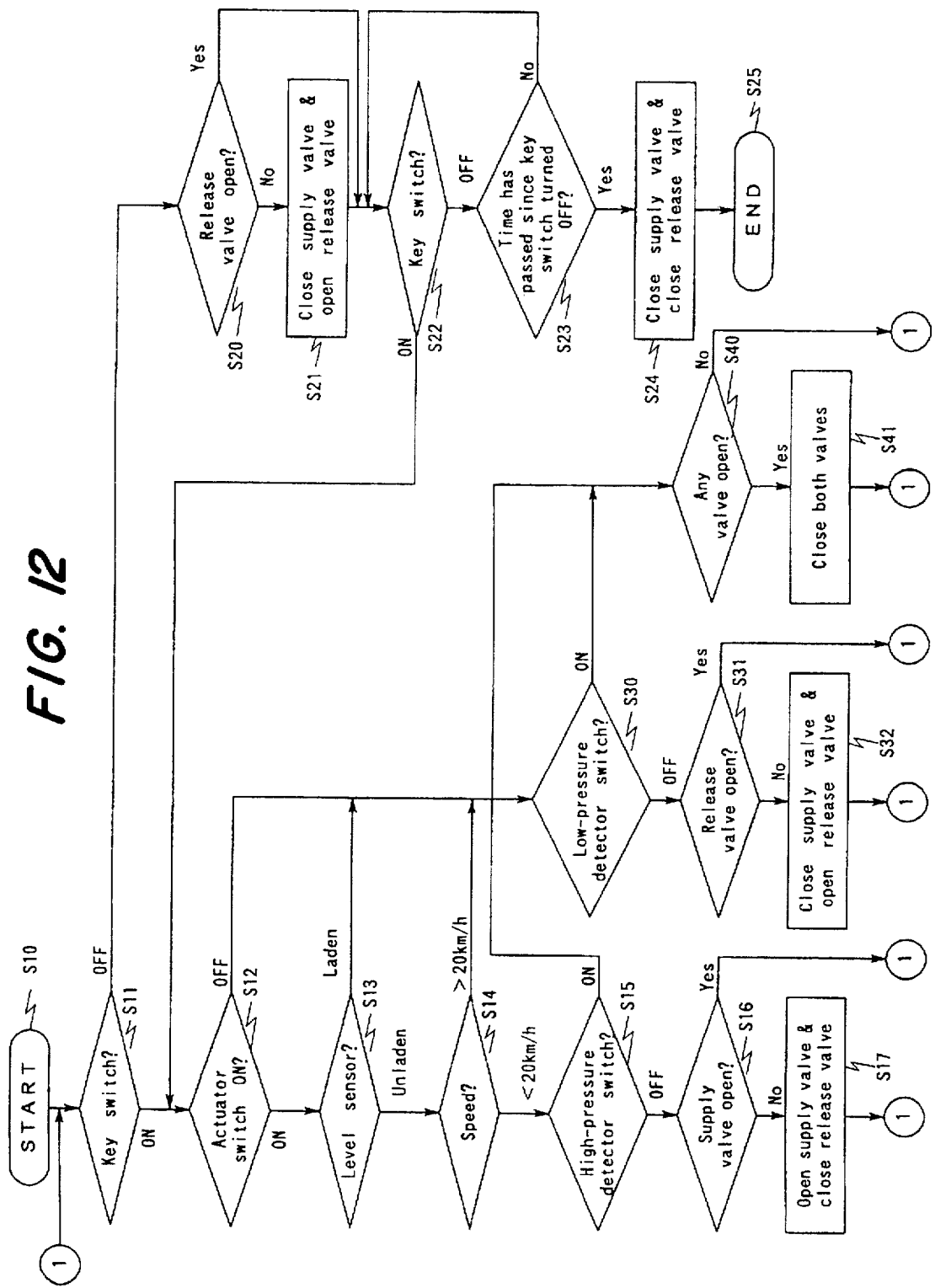
FIG. 12 is a flow chart of the process of control by the control device according to the second embodiment.

FIG. 12 is a flow chart showing the process of control by the control device 800 according to the second embodiment. As to behaviors of the start-assist system, the second embodiment follows the same process as explained with reference to FIG. 3, and explanation thereof is therefore omitted here.

Release of air of the second embodiment under no need for the aid of the start-assist system The process for releasing air in this embodiment is substantially the same as that of the first embodiment explained with reference to FIG. 3. However, while the process of the first embodiment detects in step S11 that the parking brake is not set operative and the parking brake switch is OFF before proceeding to step S12 to detect the status of the actuator switch, the process of the second embodiment detects in step S11 that the key switch is ON before proceeding to step S12 for detecting the status of the actuator switch. Explanation of the other steps of the second embodiment, identical to those of the first embodiment, are therefore omitted here.

Release of air of the second embodiment when the key switch is off

If the key switch is OFF in step S11, the process goes to step S20. If the release valve is not open, it is opened to start the release of air from the air actuator in step S21. Then, the flow proceeds to S22. If the release valve is already open in step S20, the flow goes directly to step S22.

In step S22, the status of the key switch is checked once again in order to confirm whether the key switch has remained turned off during the release of air. If it is confirmed that the key switch is kept in the OFF position in step S22, the control goes to step S23. When a predetermined length of time passes after the key switch is turned off, the process opens the valve in step S24, and completes the process.

The predetermined time, referred to above, is the time required for completely releasing air from the air actuator, and it is pre-stored in CPU 860.

Thus, parking of the vehicle under the aid of the start-assist system is prohibited by releasing air in this sequence when the key switch is turned off.

According to the second embodiment described above, in a vehicle having two rear axles one of which behaves as a drive axle, and equipped with the start-assist system which includes the air actuator attached to the drive shaft and activated upon starting the vehicle to increase the load, the start-assist system includes the control device for releasing air from the air actuator when detecting a signal indicating that the driver has stopped the vehicle and has turned off the engine key. By inactivating the start-assist system when the engine key is turned off, the parking-braking force shared by the drive wheels is made equivalent to that of a vehicle without the start-assist system, thereby to reliably prevent slippage or other like troubles of the vehicle.

Figure 13:
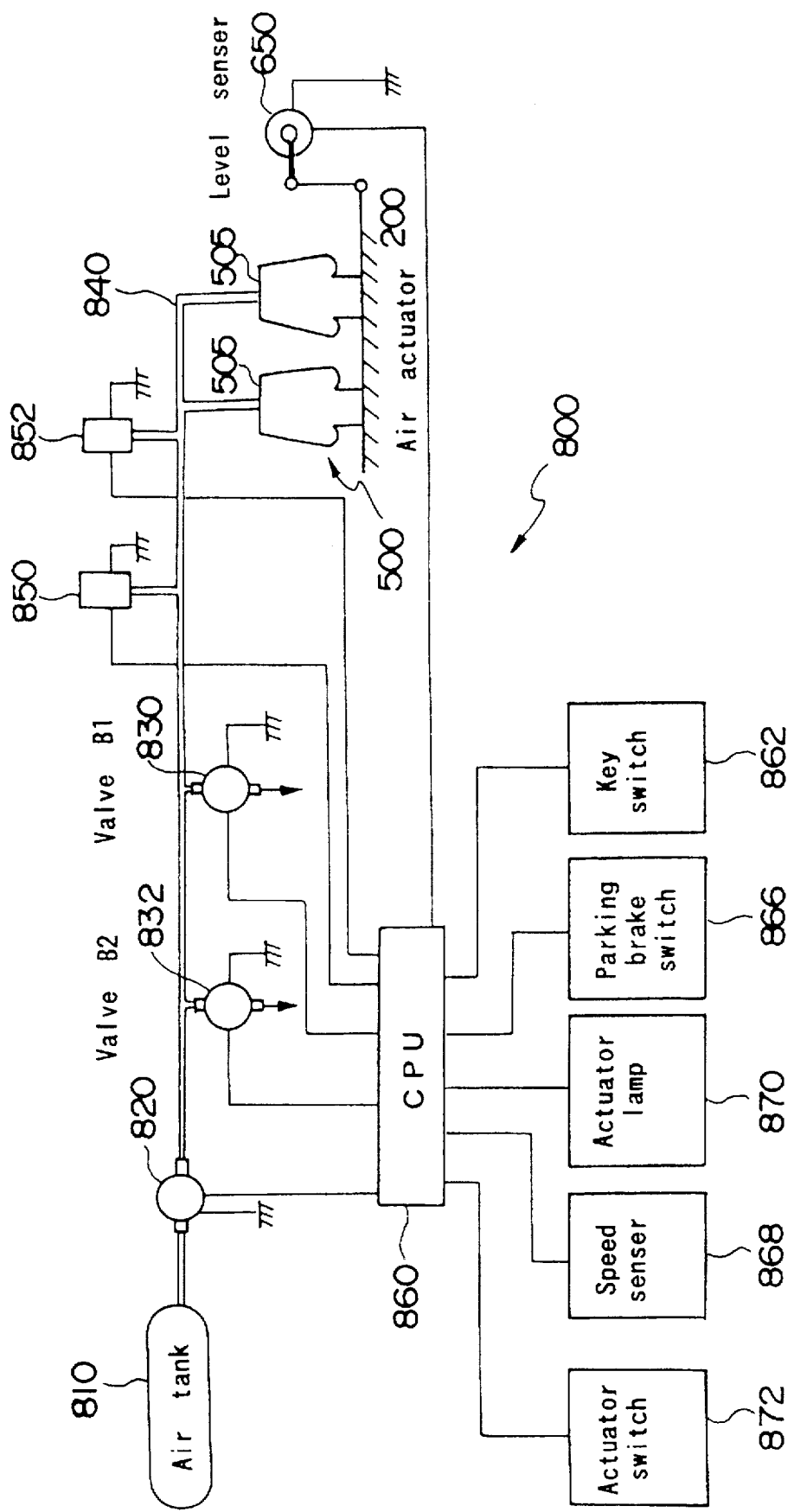
FIG. 13 is an explanatory block diagram of a control device according to a third embodiment of the invention.

FIG. 13 is an explanatory view showing a general aspect of a control device according to a third embodiment of the invention.

Operation of the star-assist System of the third embodiment

The control device 800 of a start-assist system comprises an air tank 810 containing air which is introduced into the air actuator 505 of the start-assist system 500 through a magnetic valve 820 for air supply, a first magnetic valve 830 for releasing air, a second magnetic valve 832 for releasing air, conduit 840, first pressure switch 850 for detecting a low pressure, and second pressure switch 852 for detecting a high pressure, and increases the load to the drive axle 200.

CPU 860, used as a control unit, is coupled to a key switch 862, a parking brake switch 866, an actuator switch 872, an actuator lamp 870, a speed sensor 868, the level sensor 650 for detecting the load to the axle, first pressure switch 850 for detecting a low pressure, and second pressure switch 852 for detecting a high pressure to control the magnetic supply valve 820 and magnetic release valves 830, 832.

The magnetic supply valve 820 is opened to supply air from the air tank 810 to the conduit 840, and the magnetic release valves 830, 832 are opened to release air from the conduit 840.

By using two release valves, the control device can output four different modes in response to different combinations of the opened and/or closed states of the supply valve and two release valves.

FIG. 14 shows such four different output modes. In output mode A, the supply valve is open and supplies air while both release valves are closed and do not release air from the conduit. That is, in mode A, a predetermined pressure of air is introduced to the air actuator, and the load to the drive wheels increases large enough to activate the start-assist system.

In output mode B, the supply valve closes, and one of the release valves opens. This is the pattern appearing upon releasing air from the air actuator when the vehicle, heretofore stopping, starts to run and reaches a predetermined speed. Since air is released slowly, no adverse effect occurs in the posture of the vehicle.

In output mode C, both release valves open to release air quickly. This mode appears when the parking brake is operated or when the engine key is turned off, in order to return the load to the drive wheels to a normal value before the driver leaves his seat.

When the output stops, all of the magnetic valves are inactivated.

FIG. 15 is a table showing conditions for releasing air from the air actuator and the behaviors of the valves used for releasing air.

Figure 16:
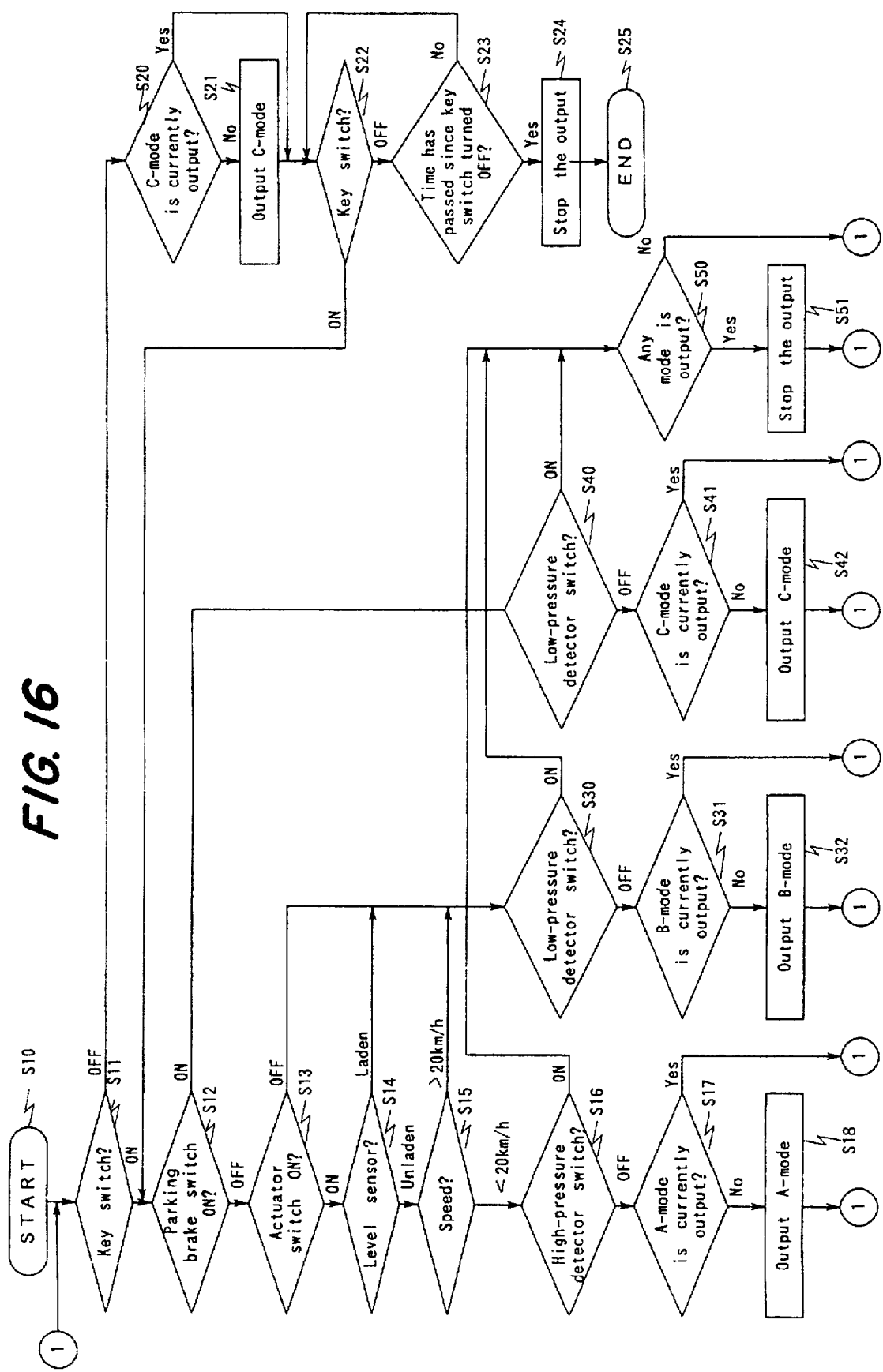
FIG. 16 is a flow chart of the process of control by the control device according to the third embodiment.

FIG. 16 is a flow chart showing the process of control by the control device 800 according to the third embodiment. The process starts with step S10 and checks the ON-OFF status of the key switch in step S11.

C mode under OFF-status of the key switch

If the key switch is OFF in step S11, the flow goes to step S20 where, if the C mode is not output, step S21 takes over to output the C mode for opening both air-release valves to quickly release air from the air actuator. Then the process goes to step S22. If the C mode is already output in step S20, the flow jumps to step S22.

In step S22, the ON-OFF status of the key switch is once again checked, since the key switch may possibly be turned ON while the C mode is output. If it is confirmed in step S22 that the key switch remains OFF, the flow proceeds to step S23 where the control stops the output and completes the process when a predetermined length of time has passed after the key switch turns OFF.

The predetermined time, referred to above, is the time required for full removal of air from the air actuator, and it is pre-stored in CPU 860.

Thus, parking of the vehicle under the aid of the start-assist system is prohibited by quickly releasing air in this manner when the key switch is turned off.

C mode output under ON-status of the parking brake

When the key switch is ON in step S11, the flow proceeds to step S12 to determine the status of the parking brake. That is, if the parking brake switch is ON, the process goes to step S40 to check the air pressure in the air actuator.

When the low-pressure detecting switch is OFF in step S40, which means that the air actuator contains sufficient air, the flow proceeds to step S41 where, if the C mode is not output, step S42 follows to output the C mode such that both release valves are opened to quickly release air from the air actuator. Then the process returns to step S11.

If the C mode is already output in step S41, the process directly returns to step S11.

If the key switch and the parking switch maintain ON-states even after returning to step S11, the same flow is repeated to continuously output the C mode until the low-pressure detecting switch turns ON in step S40.

When a sufficient amount of air is released from the air actuator and the low-pressure detecting switch turns ON in step S40, the flow proceeds to S50 and S51 and stops the output.

Thus, parking of the vehicle with the aid of the start-assist system is prohibited by quickly releasing air in this manner when the key switch is turned off.

Output of the B mode

When the key switch is ON in step S11, the flow proceeds to step S12. If the parking brake switch is OFF in step S12, next step S13 follows. If the actuator switch is OFF in step S13, the process goes to step S30. If the actuator switch is ON in step S13, step 14 follows. If the load sensor detects the vehicle laden, the flow proceeds to step S30

If the load sensor detects the vehicle unladen in step S14, step S15 follows. When speed of the vehicle is 20 km/h or faster in step S15, the flow goes to S30 to release air from the air actuator.

When the low-pressure switch is OFF in step S30, which means that the air actuator contains sufficient air, step S31 follows. If the B mode is not output, step S32 follows to output the B mode such that one of the release valves is opened to slowly release air from the air actuator. Then the process returns to step S11.

If the B mode is already output, the process directly returns to step S11.

Even after returning to step S11, the same flow is repeated to continuously output the B mode until the low-pressure detecting switch turns ON in step S30.

When a sufficient amount of air is released from the air actuator and the low-pressure detecting switch turns ON in step S30, the flow proceeds to step S50 and step S51 and stops the output.

Thus, air is fully, slowly released when the aid of the start-assist system is not desired.

Output of the A mode

The flow starts with step S11 and proceeds to step S15 following the flow chart. When the speed of the vehicle is 20 km/h or slower in step S15, the flow goes to step S16 to activate the start-assist system.

In step S16, pressure of air in the air actuator is checked. When the high-pressure detecting switch is OFF in step S16, which means that a sufficient amount of air is supplied, the flow proceeds to step S17 where, if the A mode is not output, step S18 follows to output the A mode such that the supply valve is opened to start the supply of air into the air actuator. Then the flow returns to step S11. If the A mode is already output in step S17, the flow directly returns to step S11.

Even after returning to step S11, the same flow is repeated to continuously output the A mode until the high-pressure detecting switch turns ON in step S16.

When a sufficient amount of air is introduced into the air actuator and the high-pressure detecting switch turns ON in step S16, the flow proceeds to step S50 and step S51 and stops the output.

Thus, a series of behaviors of the start-assist system is completed.

According to the third embodiment described above, in a vehicle having two rear axles one of which behaves as a drive axle, and equipped with the start-assist system which includes the air actuator attached to the drive axle and activated upon starting the vehicle to increase the load, the start-assist system slowly releases air from the air actuator under On-status of the actuator switch, laden condition or at a speed of the vehicle beyond a predetermined value, and prevents sudden changes in the posture of the vehicle. On the other hand, when the engine key is turned off or when the parking brake is activated, the start-assist system quickly discharges air from the air actuator such that parking of the vehicle with the aid of the start-assist system is prohibited to prevent a decrease in load to the drive wheels after stopping the vehicle and slippage of the vehicle on a slope.

What is claimed is:

1. A control device for a start-assist system in a vehicle having two rear axles, one of which is a drive axle and the other of which is an idler axle, said control device comprising:

an air actuator adapted to be attached to the drive axle to increase the load to drive wheels mounted on the drive axle;

a parking brake switch;

a speed sensor for detecting the speed of the vehicle;

a level sensor for detecting loads applied to the drive axle and the idler axle;

a first valve for supplying air from an air source to said air actuator;

a second valve for releasing air from said air actuator; and a control unit for controlling said first valve and said second valve, said control unit opening said second valve to release air from said air actuator upon detecting that the vehicle is stopped and said parking brake switch is in an activated condition.

2. A control device for a start-assist system in a vehicle having two rear axles, one of which is a drive axle and the other of which is an idler axle, said control device comprising:

an air actuator adapted to be attached to the drive axle to increase the load to drive wheels mounted on the drive axle;

an engine key switch;

a speed sensor for detecting the speed of the vehicle;

a level sensor for detecting loads applied to the drive axle and the idler axle;

a first valve for supplying air from an air source to said air actuator;

a second valve for releasing air from said air actuator; and a control unit for controlling said first valve and said second valve, said control unit opening said second valve to release air from said air actuator upon detecting that the vehicle is stopped and said engine key switch is turned to an off position.

3. A control device for a start-assist system in a vehicle having two rear axles, one of which is a drive axle and the other of which is an idler axle, and having a parking brake for braking a power transmission mechanism of the drive axle, said control device comprising:

an air actuator adapted to be attached to the drive axle to increase the load to drive wheels mounted on the drive axle;

an engine key switch;

a speed sensor for detecting the speed of the vehicle;

a parking brake switch for detecting activation of the vehicle parking brake to brake the power transmission mechanism;

a level sensor for detecting loads applied to the drive axle and the idler axle;

an actuator switch;

a supply valve for supplying air from an air source to said air actuator;

first and second release valves for releasing air from said air actuator; and a control unit for controlling said supply valve, said first release valve, and said second release valve, said control unit outputting a first mode signal for opening said supply valve and closing said first and second release valves, a second mode signal for closing said supply valve and opening one of said release valves, and a third mode for closing said supply valve and opening both of said release valves.

4. A control device for a start-assist system in a vehicle having two rear axles, one of which is a drive axle and the other of which is an idler axle, and having a parking brake for braking a power transmission mechanism of the drive axle, said control device comprising:

an air actuator adapted to be attached to the drive axle to increase the load to drive wheels mounted on the drive axle;

an engine key switch;

a speed sensor for detecting the speed of the vehicle;

a parking brake switch for detecting activation of the vehicle parking brake to brake the power transmission mechanism;

a level sensor for detecting loads applied to the drive axle and the idler axle;

an actuator switch;

a supply valve for supplying air from an air source to said air actuator;

first and second release valves for releasing air from said air actuator, said first and second release valves having respective air release ports of different diameters; and a control unit for controlling said supply valve, said first release valve, and said second release valve, said control unit outputting a first mode signal for opening said supply valve and closing said first and second release valves, a second mode signal for closing said supply valve and opening the one of said release valves having the smaller diameter air release port, and a third mode signal for closing said supply valve and opening the other of said release valves.

5. The control device according to claim 3 or 4 wherein said control unit outputs the first mode signal when said actuator switch is on, said level sensor indicates that the vehicle is unladen, and said speed sensor indicates that the vehicle is at a speed below a predetermined value.

6. The control device according to claim 3 or 4 wherein said control unit outputs the second mode signal in response to any one of the following conditions: (1) said actuator switch is off, (2) said level sensor indicates that the vehicle is laden, and (3) said speed sensor indicates that the speed of the vehicle is above a predetermined value.

7. The control device according to claim 3 or 4 wherein said control unit outputs the third mode signal in response to any one of the following conditions: (1) said parking brake switch indicates that the vehicle parking brake is activated and (2) said engine key switch is turned off.

* * * * *